United States Patent
Aly et al.

(10) Patent No.: US 9,659,235 B2
(45) Date of Patent: May 23, 2017

(54) LOW-DIMENSIONAL STRUCTURE FROM HIGH-DIMENSIONAL DATA

(75) Inventors: Alaa E. Abdel-Hakim M. Aly, Assiut (EG); Motaz Ahmad El-Saban, Cairo (EG)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 13/528,711

(22) Filed: Jun. 20, 2012

(65) Prior Publication Data

US 2013/0346082 A1   Dec. 26, 2013

(51) Int. Cl.
| | |
|---|---|
| *G10L 21/00* | (2013.01) |
| *G06K 9/62* | (2006.01) |
| *G06F 17/30* | (2006.01) |
| *H04N 19/147* | (2014.01) |
| *H04N 19/172* | (2014.01) |
| *H04N 19/46* | (2014.01) |
| *H04N 19/142* | (2014.01) |
| *H04N 19/162* | (2014.01) |

(52) U.S. Cl.
CPC ..... *G06K 9/6249* (2013.01); *G06F 17/30943* (2013.01); *H04N 19/142* (2014.11); *H04N 19/147* (2014.11); *H04N 19/162* (2014.11); *H04N 19/172* (2014.11); *H04N 19/46* (2014.11)

(58) Field of Classification Search
USPC ........................................................ 704/270
See application file for complete search history.

(56) References Cited

U.S. PATENT DOCUMENTS

| | | | | |
|---|---|---|---|---|
| 7,447,337 | B2 * | 11/2008 | Zhang et al. | 382/107 |
| 7,463,754 | B2 | 12/2008 | Yang et al. | |
| 7,490,073 | B1 | 2/2009 | Qureshi et al. | |
| 7,558,402 | B2 | 7/2009 | Zhou et al. | |
| 8,121,818 | B2 * | 2/2012 | Gorinevsky | 702/183 |
| 8,339,897 | B2 * | 12/2012 | Aeron et al. | 367/32 |

OTHER PUBLICATIONS

Li, et al., "An Integrated Algorithm of Incremental and Robust PCA", In Proceeding of IEEE International Conference on Image Processing, vol. 1, Sep. 14, 2003, pp. 245-248.

(Continued)

Primary Examiner — Leonard Saint Cyr

(57) ABSTRACT

Low-dimensional structure from high-dimensional data is described for example, in the context of video foreground/background segmentation, speech signal background identification, document clustering and other applications where distortions in the observed data may exist. In various embodiments a first convex optimization process is used to find low dimensional structure from observations such as video frames in a manner which is robust to distortions in the observations; a second convex optimization process is used for incremental observations so bringing computational efficiency whilst retaining robustness. In various embodiments error checks are made to decide when to move between the first and second optimization processes. In various examples, the second convex optimization process encourages similarity between the solution it produces and the solution of the first convex optimization process, for example, by using an objective function which is suitable for convex optimization.

20 Claims, 6 Drawing Sheets

(56) References Cited

OTHER PUBLICATIONS

Zhao, et al., "A Novel Incremental Principal Component Analysis and Its Application for Face Recognition", In Proceedings of IEEE Transactions on Systems, Man, and Cybernetics, Part B: Cybernetics, vol. 36, Issue 4, Aug. 2006, pp. 873-886.
Lin, et al., "Fast Convex Optimization Algorithms for Exact Recovery of a Corrupted Low-Rank Matrix", In Computational Advances in Multi-Sensor Adaptive Processing, Dec. 2009, 18 pages.
Papusha, Ivan, "Fast Automatic Background Extraction via Robust PCA", Published on: Jun. 6, 2011, Available at: http://www.cds.caltech.edu/~ipapusha/pdf/robust_pca_apps.pdf, 11 Pages.
Balzano, et al., "Online Identification and Tracking of Subspaces from Highly Incomplete Information". In Proceedings of Allerton, Sep. 2010. Available at http://arxiv.org/abs/1006.4046.2. 11 Pages.
Cabral, et al., "Fast Incremental Method for Matrix Completion: An Application to Trajectory Correction". In Proc. IEEE International Conference on Image Processing, Brussels, Belgium, Sep. 2011. 4 Pages.
Lin, et al., "Fast Convex Optimization Algorithms for Exact Recovery of a Corrupted Low-Rank Matrix". IEEE Transactions on Pattern Analysis and Machine Intelligence, pp. 1-18, 2009.
Wright, et al., "Robust Principal Component Analysis: Exact Recovery of Corrupted Low-Rank Matrices by Convex Optimization". In proceedings of Neural Information Processing Systems (NIPS), Dec. 2009. 9 Pages.

\* cited by examiner

LOW-DIMENSIONAL STRUCTURE FROM HIGH-DIMENSIONAL DATA

BACKGROUND

In many applications high-dimensional data is to be exploited, such as for image processing, object recognition, information retrieval, audio/video processing, bioinformatics and other applications. Data such as images, audio files, videos, text documents and the like typically lie in high-dimensional feature spaces where the number of dimensions may be a six digit figure or higher. For example, given a corpus of text documents, the text documents may be represented in a high dimensional space where each unique word which is present in at least one of the documents is a dimension.

In order to exploit such high-dimensional data in tasks such as object recognition, document clustering and the like, one option is to map the data to a lower dimensional space or to find lower dimensional structure within the high-dimensional data. One approach has been to use Principal Component Analysis (PCA) to find lower dimensional structure within high dimensional data. However, the presence of noise and distortion in the data may act to degrade the performance of known PCA processes. This may happen for example, where image capture devices introduce additive noise and/or where occlusions are present in a captured image. For applications where noise and distortion present a problem one option is to use a modified PCA process which is more robust. However, robust PCA processes often suffer from efficiency problems with scalable input data and real-time applications.

The embodiments described below are not limited to implementations which solve any or all of the disadvantages of known processes for finding low-dimensional structure from high-dimensional data.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Low-dimensional structure from high-dimensional data is described for example, in the context of video foreground/background segmentation, speech signal background identification, document clustering and other applications where distortions in the observed data may exist. In various embodiments a first convex optimization process is used to find low dimensional structure from observations such as video frames in a manner which is robust to distortions in the observations; a second convex optimization process is used for incremental observations so bringing computational efficiency whilst retaining robustness. In various embodiments error checks are made to decide when to move between the first and second optimization processes. In various examples, the second convex optimization process encourages similarity between the solution it produces and the solution of the first convex optimization process, for example, by using an objective function which is suitable for convex optimization.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
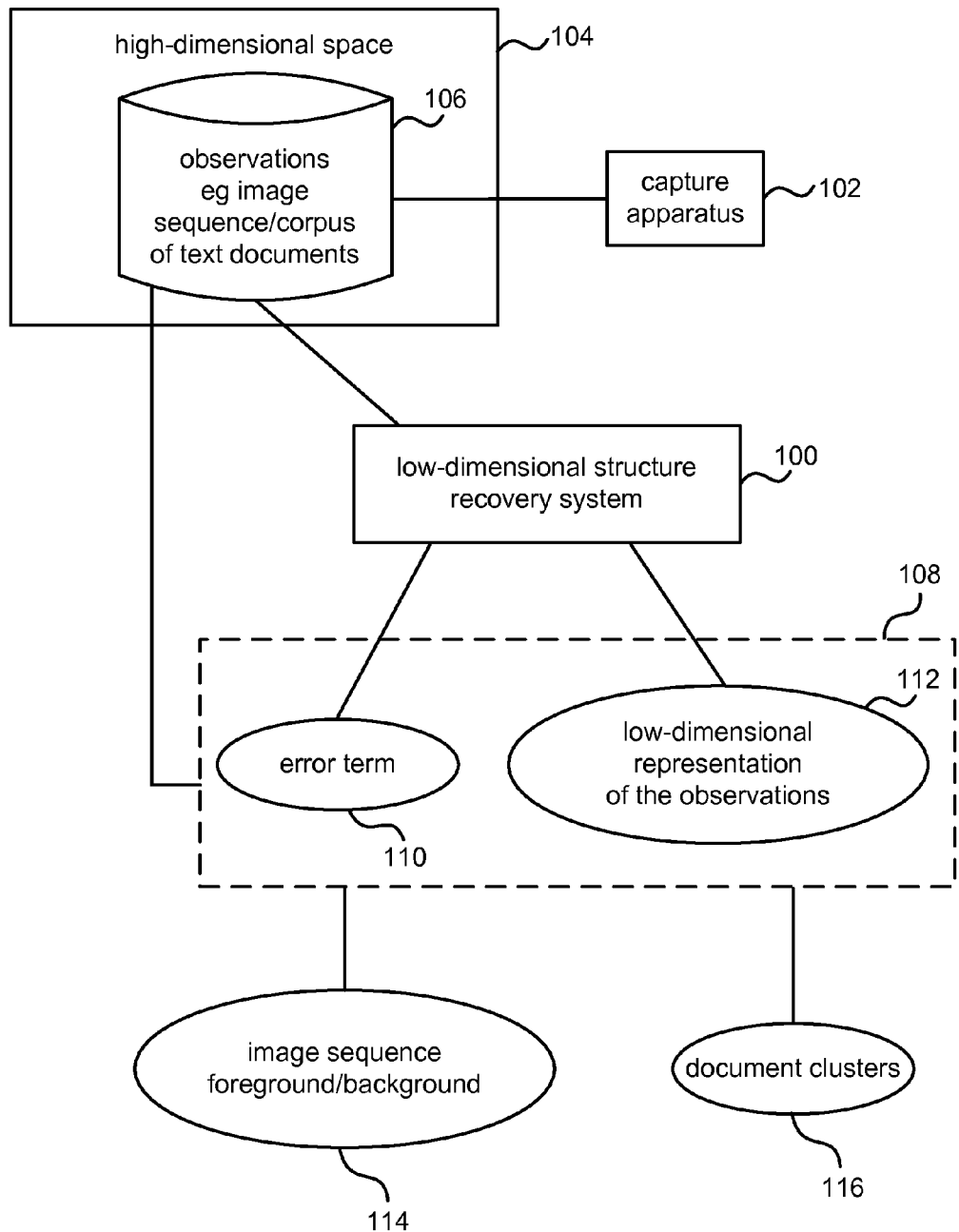
FIG. 1 is a schematic diagram of a system for recovering low-dimensional structure from high-dimensional data.

FIG. 1 is a schematic diagram of a low-dimensional structure recovery system 100 which is computer-implemented. According to the particular application domain concerned, images, text documents or other observations 106 are accessible to the low-dimensional structure recovery system 100 for example, over a communications link or in any other way. The observations occur in a high-dimensional space 104 where each dimension is a feature that an observation may have. For example, the observations may be text documents and the features may be words. In another example, the observations may be images and the features may be pixel or image element values. An image element is a pixel, voxel or group of pixels or voxels. The observations 106 may be empirically observed using a capture apparatus 102 of any suitable type. For example, a camera, video camera, depth camera, microphone, document capture apparatus, light sensor, orientation sensor. The capture apparatus 102 may introduce noise and/or distortions into the observations 106.

The low-dimensional structure recovery system 100 produces output 108 comprising a low-dimensional representation 112 of the observations and an error term 110. In an example, the recovery system 100 is able to use the low-dimensional representation 112 for image sequence foreground/background segmentation 114. For example, the observations may be videos or other sequences of images and the output 108 may provide an identification of background image elements. The recovery system 100 may use an incremental process as described in more detail below which enables output to be obtained in real-time (for example, at video or audio frame rates) whilst maintaining accuracy and robustness to noise and distortion in the observations. In other examples the observations are text documents and the output 108 may provide document clusters 116. Many other examples are possible in other application domains.

The low-dimensional representation 112 of the observations is a representation in a space having fewer dimensions than the high-dimensional space 104. For example, in the case of text documents, the high-dimensional space may have one dimension for each different word observed in a corpus of documents. The low-dimensional space may have one dimension for each topic observed in the corpus of documents. The error term 110 may comprise information about how to distort the low-dimensional representation 112 in order to return to the observations 106 in the original high-dimensional space. For example, matrices, which are two-dimensional arrays of elements, may be used to represent the observations 106 and the outputs 108. The observations 106 may be stored in a high rank matrix (where high rank means that the matrix has many columns, one for each dimension of the feature space) and the outputs 108 may comprise a low-rank matrix (whose rank is much smaller than the dimension of the input data) and a sparse matrix comprising the error term 110.

As mentioned above, the low-dimensional structure recovery system 100 is computer-implemented. In other examples the low-dimensional structure recovery system may be provided, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics processing units (GPUs).

The low-dimensional structure recovery system 100 uses an incremental process to produce the output. An example of the incremental process is now described with reference to FIG. 2 for an image sequence analysis application. However, the method of FIG. 2 may also be used in other application domains.

In an example, the low-dimensional structure recovery system 100 comprises an input arranged to access a plurality of first observations at least some of which comprise distortions. The system 100 uses a first convex optimization process over the accessed first observations to find a working solution comprising a lower dimensional representation of the accessed first observations and an error term. For example, the system 100 may carry out the first convex optimization itself or may receive the results of that computation from another entity such as a web service or a distributed computing resource. The first convex optimization process is robust to the distortions in the accessed first observations. The system 100 also has an input arranged to access at least one additional observation. The system 100 is arranged to use a second convex optimization process over only the accessed additional observation to find an incremental solution comprising a lower dimensional representation of the additional observation and an incremental error term; and to update the working solution using the incremental solution. The second convex optimization process is much less computationally intensive than the first convex optimization process because it only uses the additional observations. The second convex optimization process is found to give accurate, robust results where the additional observation is an increment over the first observations. Error checks may be made to decide when to move between the first and second convex optimization processes.

Figure 2:
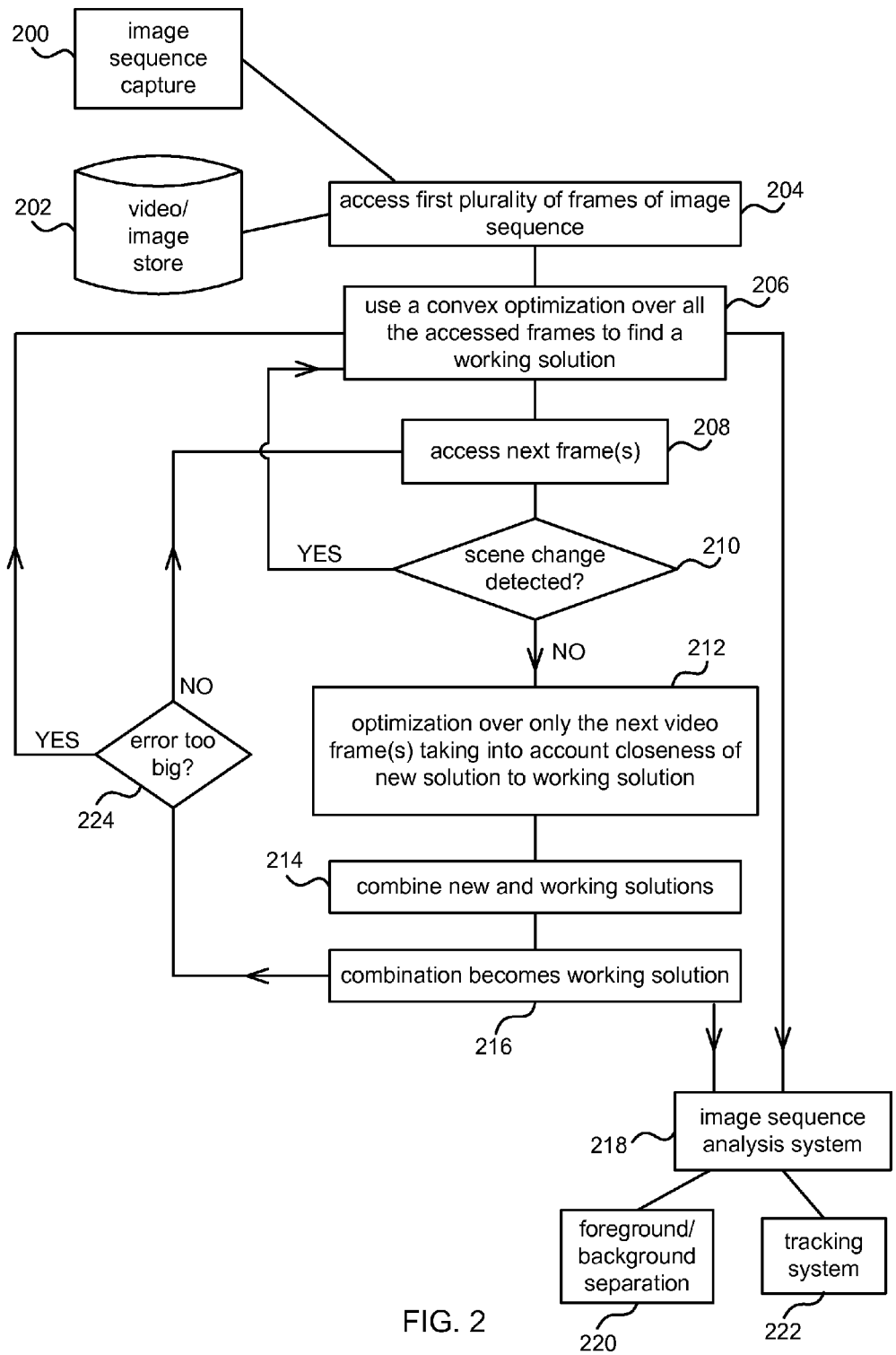
FIG. 2 is a flow diagram of a method of image processing such as for foreground/background separation and/or tracking.

In the example of FIG. 2 the observations comprise sequences of images. For example, these may be captured by an image sequence capture apparatus 200 and/or may be accessed from a store 202 such as a video or image store. A first plurality of frames of the image sequence are accessed 204. For example, a first plurality of frames (such as 100 frames in one example) of a video sequence may be accessed by a low-dimensional structure recovery system. (Other numbers of frames may be accessed; the example of 100 frames used here is illustrative only.) The system computes a convex optimization 206 over the accessed frames to find a working solution; that is an initial solution for the low-dimensional representation 112 of the observations and the error term 110. A convex optimization is a process for finding the global minimum of a convex function. The convex optimization uses a cost function where sparse errors and low-rank terms are part of the estimated solution. For example, the convex optimization may comprise a robust principal component analysis (RPCA) process as described in Wright et al. 2009 "Robust principal component analysis: Exact recovery of corrupted low-rank matrices by convex optimization." In Proceedings of Neural Information Processing Systems (NIPS), December 2009. An RPCA technique assumes that the high-dimensional input data comprises a low rank term that is superimposed by a sparse-error term. The solution of the low rank term recovery is achieved by reformulation of the problem as an optimization problem which aims at estimating the minimum rank of the low rank term and the sparsest representation of the error term. This problem is solved as a constrained convex optimization problem. The optimization constraint is that the obtained low-rank and sparse error terms add up to the input data.

The convex optimization 206 over the accessed frames comprises a core computation which depends on singular value decomposition (SVD) computations. This means that the time efficiency of the process is quadratically degraded with the increase of the number of observations, where the number of observations is less than the number of dimensions (features) of a single observation (which is often the case for applications like video stream background subtraction, video tracking and others).

The low-dimensional structure recovery system accesses 208 the next frame or frames of the sequence. Instead of re-computing the convex optimization over the 100 accessed frames plus the newly accessed frames, the system carries out an optimization over only the newly accessed frames. This is found to give an accurate, robust solution which may be achieved in real time, for situations where the newly accessed frames are an increment over the original 100 frames.

The system may optionally check whether the newly accessed frames are an increment over the original 100 frames. For example, a check is made for a scene change 210 in the image sequence. Any suitable method may be used to check for a scene change. For example, taking a histogram of pixel intensity values by frame and comparing this for the original 100 frames and the newly accessed frames. Other methods may be used such as accessing metadata associated with the frames or using input from a video analysis system. If a scene change is detected the low-dimensional structure recovery system continues to use the convex optimization process over all the accessed frames (the original ones and the newly accessed ones together).

If no scene change is detected an optimization 212 proceeds over only the newly accessed video frames. This optimization is guided so that it encourages the closeness of the new solution to the working solution. The result is a new solution which may be combined 214 with the working solution. The combination becomes 216 the new working solution.

An optional check is made on the accuracy of the new working solution. If the accuracy is acceptable then the process proceeds to access the next frame or frames at step 208. If the accuracy is not acceptable then the process returns to using the computationally intensive convex optimization over all the accessed frames at step 206. The optional check may be made each time the working solution is updated, or at other intervals as specified by an operator, or where the intervals are dynamically selected by an automated process. Various different ways in which the check may be made are described below with reference to FIG. 4.

The working solution may be output as indicated in FIG. 2 to an image sequence analysis system 218. For example, the output may be used to obtain a foreground/background separation of the image sequence 220. In another example the output may be used in a tracking system 222 in order to track foreground objects depicted in a video or other image sequence. For example, the elements of the low rank matrix may be looked at as a background of those video frames. For example, the background may be computed as an average of the low rank matrices computed from each frame.

In some examples, the method of FIG. 2 may be modified so that whilst the incremental process of step 212 is carried out, the system also calculates a convex optimization over all (the original and incremental) the frames. The system is then able to switch between the results of either of these two optimizations according to any of: user input, automated error assessments, or other criteria.

Figure 3:
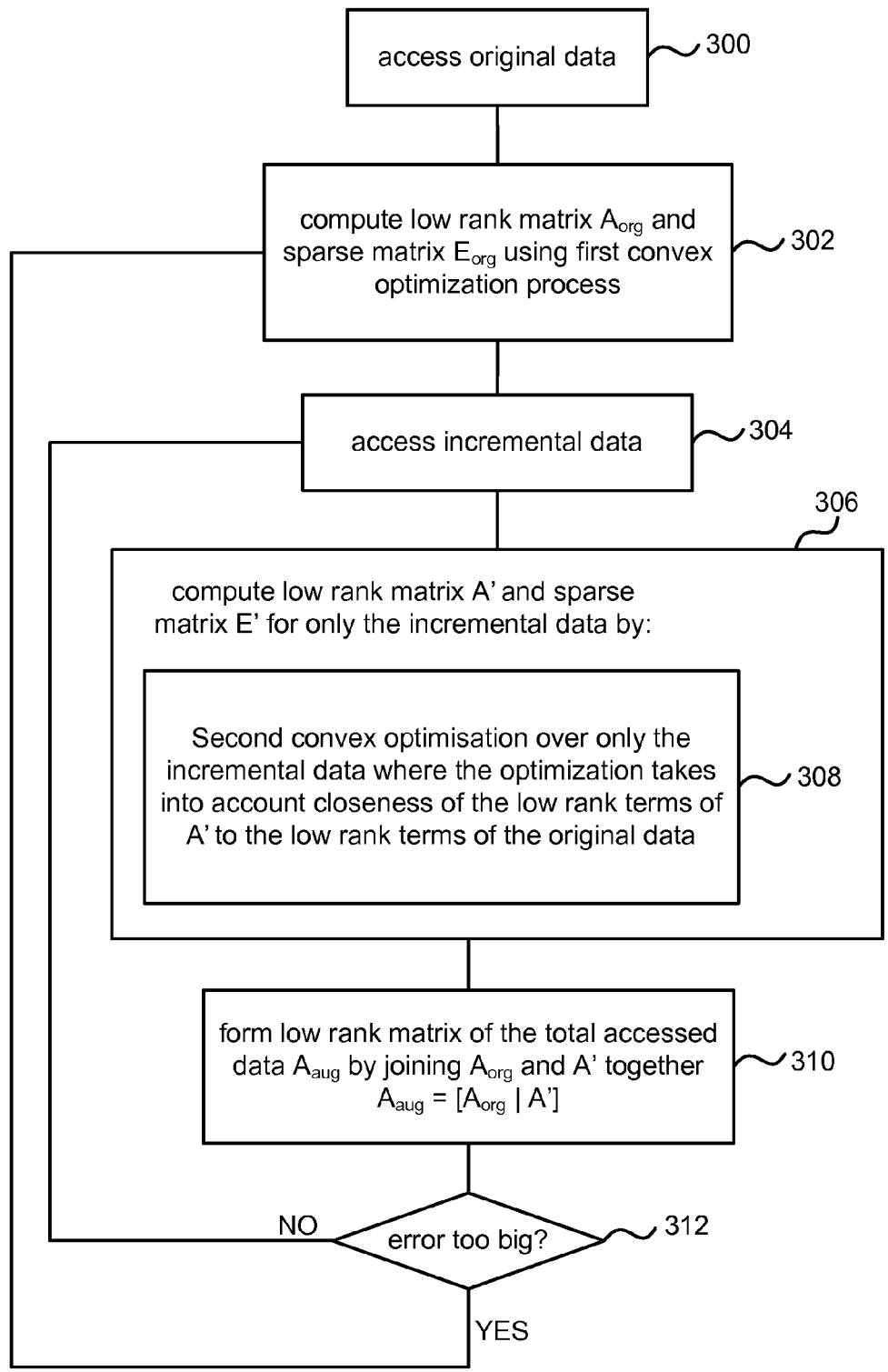
FIG. 3 is a flow diagram of a method of computing low-dimensional structure from high-dimensional data.

FIG. 3 is a flow diagram of a method of computing low-dimensional structure from high-dimensional data. This method may be used to implement the method of FIG. 2 where the data comprise frames of image sequences. It may also be used to implement methods where the data is of other types.

A low-dimensional structure recovery system accesses 300 original data comprising a plurality of observations in a high-dimensional space. The term "original" is used here to indicate that the observations are initial ones that the process begins with in contrast to incremental data. The system computes 302 a low rank matrix $A_{org}$ and a sparse matrix $E_{org}$ from the original data using a robust principal component analysis method. The low rank matrix and the sparse matrix together form a working solution.

The system accesses 304 incremental data such as newly received or accessed observations and proceeds to compute 306 a low rank matrix A' and sparse matrix E' for only the incremental data. This is achieved by computing a convex optimization over only the incremental data where the optimization takes into account an objective function.

The objective function may be any function which encourages similarity between the new solution and the current working solution. This may be expressed mathematically as:

$$f(A_{org}, A') = \min d([A_{org}]j, A')$$

where d(.,.) is any similarity measure and j is the index of the columns of a matrix.

In the following example, the objective function encourages closeness of the low rank terms of A' to the low rank terms of the original data. This may be represented mathematically by:

$$(A', E') = \arg\min_{A', E'} \text{rank}(A') + \gamma_1 \|E'\|_0 + \gamma_2 f(A_{org}, A')$$

Where $\gamma_1$ and $\gamma_2$ are arbitrary coefficients and the objective function is represented by $f(A_{org}, A')$. The arbitrary coefficients may be tuned potentially by a validation set. The above equation may be expressed in words as the low rank matrix of the incremental observations A' and the sparse error matrix of the incremental observations E' are calculated as the solution which gives the minimum of the rank of the matrix of the low rank matrix of incremental observations A' plus the zero norm of the sparse matrix weighted by coefficient $\gamma_1$ and plus a measure of the closeness of the low rank matrix of the original observations to the low rank matrix of the incremental observations, that measure of closeness weighted by a coefficient $\gamma_2$. A norm of a matrix is usually notated using a double vertical line as in the above equation where the symbol $\|E'\|_0$ represents the zero norm of the sparse error matrix of the incremental observations. A zero norm of a matrix is the number of non-zero elements so that this may be a measure of the sparsity of the matrix E'.

In order to make the above equation suitable for convex optimization a nuclear norm may be used to represent the rank and an L1-norm may be used to replace the zero-norm as a representation of sparsity. An L1 norm, or Manhattan-distance norm, represents the summation of the absolute values of its elements. A nuclear norm is the summation of singular values of the matrix elements.

Various ways of calculating an objective function which encourages closeness of the low rank terms of A' to the low rank terms of the original data are possible. For example, the squared Frobenius norm of the difference between the mean low-rank terms of the original observations and the estimated low-rank of the new observations. Squared Frobenius norm is a convex function and so useful in the case where convex optimization is being used. A Frobenius norm is the Euclidian norm which is the square root of the absolute squares of its elements. Where the squared Frobenius norm is used to calculate the objective function $f(A_{org}, A')$ the above equation becomes:

$$(A', E') = \arg\min_{A', E'} \|A'\|_* + \gamma_1 \|E'\|_1 + \gamma_2 \left\| \left[ \left(\frac{1}{n}\sum_{j=1}^{n} A_{org}^j\right) * M \right] - A' \right\|_F^2 \in \mathbb{R}^{m \times k}$$

Which may be expressed in words as the low rank matrix of the incremental observations A' and the sparse error matrix of the incremental observations E' are calculated as the solution which gives the minimum of the nuclear norm of the low rank matrix of incremental observations A' plus the L1 norm of the sparse matrix weighted by coefficient $\gamma_1$ and plus the square of the Frobenius norm of the difference between the low rank matrix of incremental observations and the average of the columns of the matrix of the original observations times a matrix-dimension-adjustment unit row vector M, the square of the Frobenius norm being weighted by a coefficient $\gamma_2$.

A low rank matrix of the total accessed data $A_{aug}$ is formed by joining $A_{org}$ and A' together. This may be represented mathematically as:

$$A_{aug} = [A_{org} | A']$$

An optional check 312 is made as to the accuracy of the solution. If the error is acceptable the process proceeds to access more incremental data. If the error is not acceptable the process returns to using the robust principal component analysis.

Figure 4:
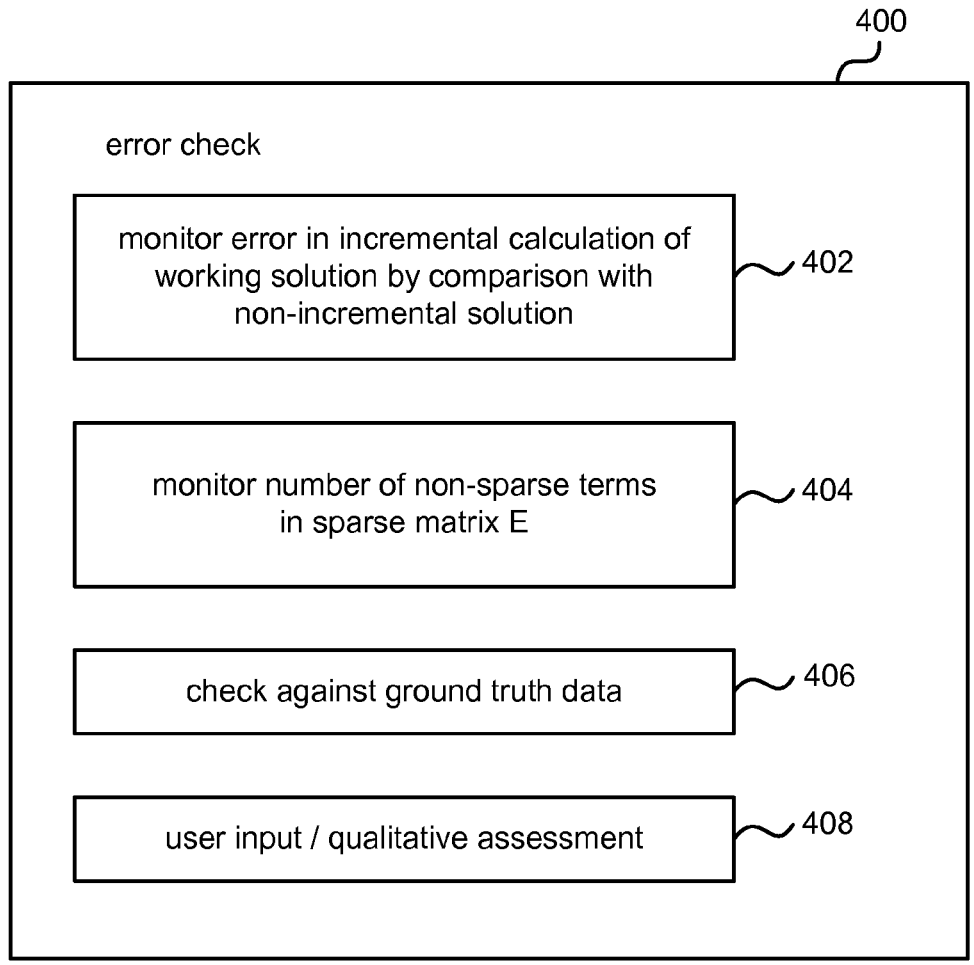
FIG. 4 is a schematic diagram of an error check component.

FIG. 4 is a schematic diagram of an error check component 400. This component may be arranged to carry out one or more checks on the accuracy of the incremental solution.

For example, it may be arranged to compare 402 the incremental solution with a non-incremental solution obtained by computing an optimization over all the available observations (original and incremental). It may also monitor 404 a number of non-sparse terms in the sparse matrix. If the number of non-sparse terms is greater than a threshold then the error may be unacceptable. The error check component 400 may have access to ground truth data from user input or from other sources and may use this to check 406 for errors. It may also receive user input providing a qualitative assessment 408 of the solution. For example, in the case of video foreground/background subtraction a user may view a display of the segmented video and provide a qualitative assessment of the solution.

In an example, a video sequence is input to a system as described herein and the output video foreground displayed to a user. For example, the video sequence may be of motor traffic on a highway. The system may also calculate traffic speeds of motor vehicles depicted in the video and display the calculated speeds in conjunction with the video foreground. User input may be received and used to adjust parameters used by the system in order to control the accuracy and/or quality of the working solution and the speed in which the lower-dimensional representation of the working solution is calculated and displayed. User input may be used to adjust parameters of the system in this way for other types of observations as well as video observations.

Figure 5:
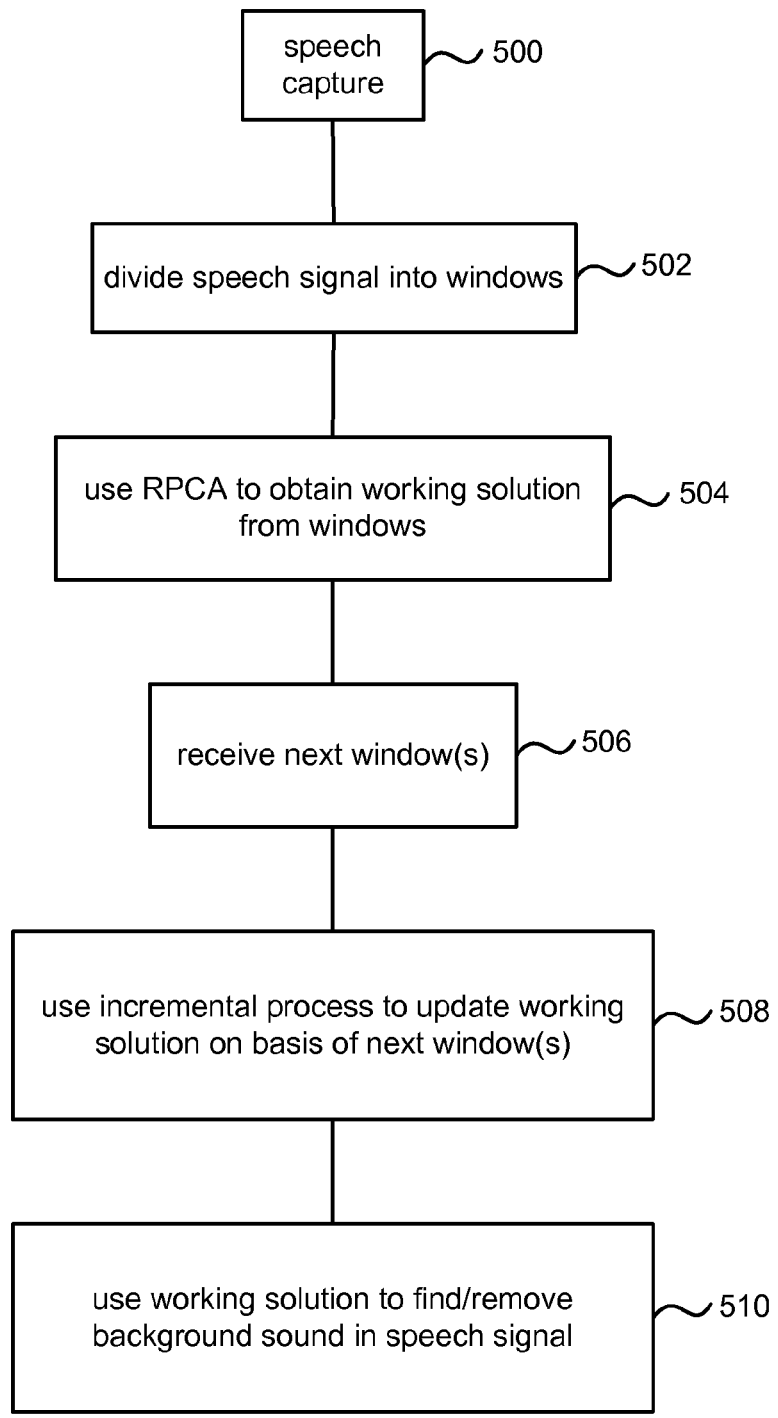
FIG. 5 is a flow diagram of a method of finding and/or removing background sound from a speech signal.

FIG. 5 is a flow diagram of a method of finding and/or removing background sound from a speech signal. A speech signal is captured 500 using a microphone or other speech capture device. The speech signal may be captured offline or dynamically as the process proceeds. The speech signal may comprise background sound from the environment or introduced as noise by the recording equipment. The speech signal is divided 502 into windows where each window is a portion of the speech signal over a time interval. The windows may be overlapping or not overlapping. A robust principal component analysis process is applied to the windows to obtain a working solution comprising a low rank matrix and a sparse error matrix. Any suitable method of robust principal component analysis may be used which comprises using a convex optimization to search for a solution where the optimization uses a cost function where sparse errors are part of the estimated solution.

One or more next windows are received 506 and these form incremental observations for use in an incremental process as described above with reference to FIG. 3. The incremental process is used 508 to update the working solution. This is achieved by searching for a solution using a convex optimization process over only the incremental observations (the next windows received at step 506) and where the search uses an objective function which encourages closeness of the new solution to the existing working solution found at step 504. The new solution is used to update the working solution. The working solution is then used 510 to find and/or remove background sound from the speech signal.

Figure 6:
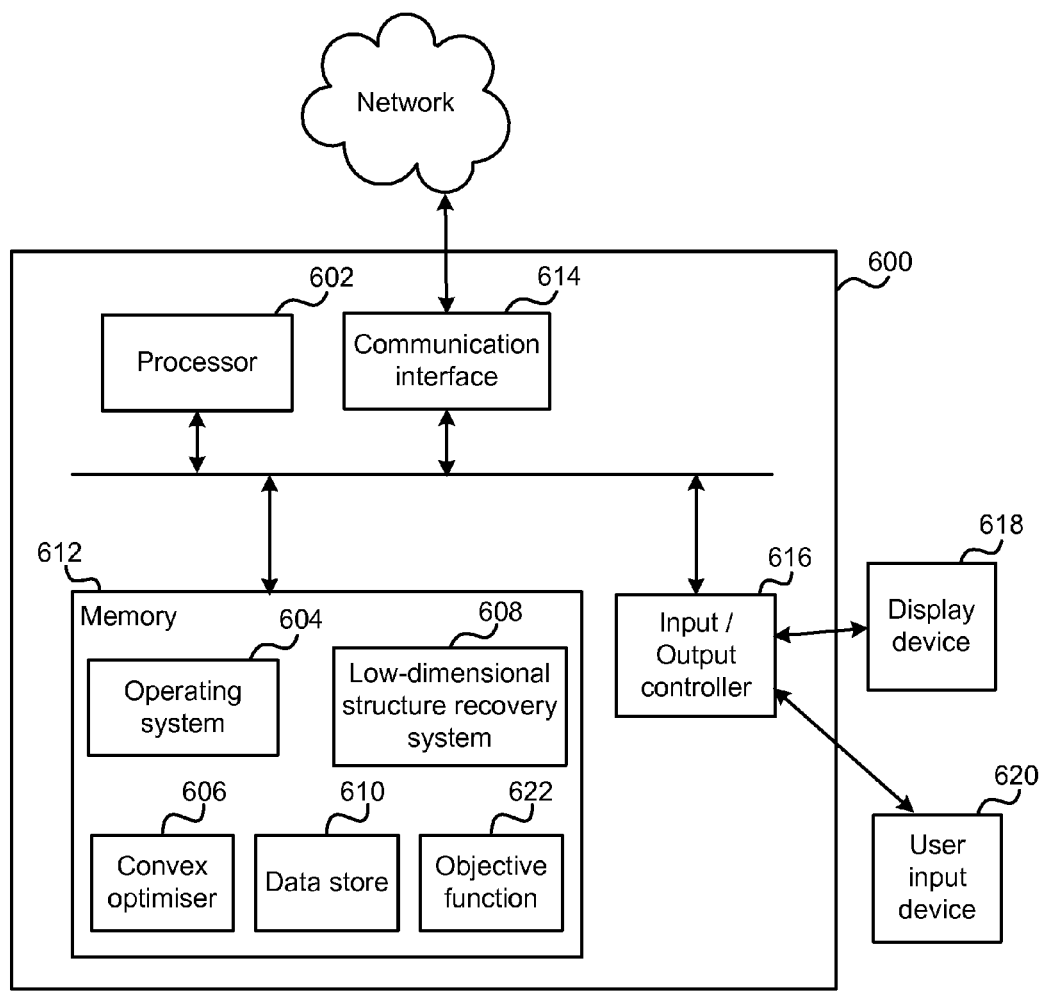
FIG. 6 illustrates an exemplary computing-based device in which embodiments of a system for recovering low-dimensional structure from high-dimensional data may be implemented.

FIG. 6 illustrates various components of an exemplary computing-based device 600 which may be implemented as any form of a computing and/or electronic device, and in which embodiments of a low-dimensional structure recovery system may be implemented.

Computing-based device 600 comprises one or more processors 602 which may be microprocessors, controllers or any other suitable type of processors for processing computer executable instructions to control the operation of the device in order to recover low dimensional structure from high-dimensional observations. In some examples, for example where a system on a chip architecture is used, the processors 602 may include one or more fixed function blocks (also referred to as accelerators) which implement a part of the method of any of FIGS. 2 to 5 in hardware (rather than software or firmware). Platform software comprising an operating system 604 or any other suitable platform software may be provided at the computing-based device to enable application software to be executed on the device. A low-dimensional structure recovery system 608 may be provided at the device as well as a convex optimizer 606 and an objective function 622. The convex optimizer 606 is arranged to carry out any convex optimization process including but not limited to: bundle methods, subgradient projection, interior point methods, cutting plane methods, ellipsoid method, subgradient methods. The objective function is arranged to encourage the solution found by the convex optimizer 606 to be similar to a specified solution. A data store 610 may be provided to store parameters for use by the low-dimensional structure recovery system, observations for input to the low-dimensional structure recovery system and optionally also to store outputs from the low-dimensional structure recovery system.

The computer executable instructions may be provided using any computer-readable media that is accessible by computing based device 600. Computer-readable media may include, for example, computer storage media such as memory 612 and communications media. Computer storage media, such as memory 612, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 612) is shown within the computing-based device 600 it will be appreciated that the storage may be distributed or located remotely and accessed via a network or other communication link (e.g. using communication interface 614).

The computing-based device 600 also comprises an input/output controller 616 arranged to output display information to a display device 618 which may be separate from or integral to the computing-based device 600. The display information may provide a graphical user interface. The input/output controller 616 is also arranged to receive and process input from one or more devices, such as a user input device 620 (e.g. a mouse, keyboard, camera, microphone or other sensor). In some examples the user input device 620 may detect voice input, user gestures or other user actions and may provide a natural user interface (NUI). This user input may be used to set parameter values for use by the low-dimensional structure recovery system, to specify which observations are to be used to form the working solution, to access results of the low-dimensional structure recovery system and for other purposes. In an embodiment the display device 618 may also act as the user input device 620 if it is a touch sensitive display device. The input/output controller 616 may also output data to devices other than the display device, for example, a locally connected printing device.

The input/output controller 616, display device 618 and optionally the user input device 620 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of computing low-dimensional structure from a plurality of images, the method comprising:
 accessing, from at least one of an image capture device or image or video store, a plurality of first images at least some of which comprise distortions;
 using a first convex optimization process over the accessed first images to find a working solution comprising a lower dimensional representation of the accessed first images and an error term, the first convex optimization process being robust to the distortions in the accessed first images;
 accessing at least one additional image;
 using a second convex optimization process over only the accessed additional image to find an incremental solution comprising a lower dimensional representation of the additional image and an incremental error term;

updating, by a processor, the working solution using the incremental solution; and outputting the updated working solution to an image sequence analysis system;

wherein the image sequence analysis system is performing at least one of foreground/background image separation of images or tracking foreground objects depicted in images.

2. The method of claim 1, wherein the first convex optimization process uses a cost function where sparse errors and low rank terms are part of an estimated solution.

3. The method of claim 1, further comprising:

checking whether the at least one additional image is an increment over the first images;

responsive to a determination that the at least one additional image is the increment over the first images, carrying out the second convex optimization process; and responsive to a determination that the at least one additional image is not the increment over the first images, using the first convex optimization process over the first images combined with the at least one additional image.

4. The method of claim 1, further comprising:

checking accuracy of the updated working solution and selecting whether to continue with the second convex optimization process or the first convex optimization process according to the results of the accuracy check.

5. The method of claim 4, further comprising:

checking the accuracy by assessing the incremental error term.

6. The method of claim 4, further comprising:

checking the accuracy by displaying the incremental solution to a user and receiving input in response.

7. The method of claim 4, further comprising:

checking the accuracy by comparing the incremental solution with the working solution.

8. The method of claim 1, wherein the second convex optimization process is carried out using an objective function which encourages similarity between the incremental solution and the working solution.

9. The method of claim 8, wherein the objective function is compatible with convex optimization.

10. The method of claim 1, wherein the working solution and the incremental solution each comprise a lower dimensional representation in the form of a low rank matrix and an error term in the form of a sparse matrix and where the sparse matrix may be used to distort the low rank matrix to return to the images.

11. The method of claim 8, wherein the objective function comprises a squared Frobenius norm of the difference between mean low-rank terms of the first images and an estimated low-rank of the at least one additional image.

12. The method of claim 1, wherein the second convex optimization process comprises finding a minimum of a nuclear norm of a low rank matrix of the at least one additional image A' plus an L1 norm of a sparse matrix being the incremental error term, weighted by a first coefficient $\gamma_1$ and plus the square of a Frobenius norm of the difference between the low rank matrix of the at least one additional image and an average of columns of a matrix of the first images, the square of the Frobenius norm being weighted by a second coefficient $\gamma_2$.

13. The method of claim 1, further comprising:

displaying image foregrounds determined by the image sequence analysis system to a user and receiving input from the user to control at least one of accuracy or quality of the working solution or the speed of calculating the working solution.

14. A method comprising:

accessing a plurality of first windows, each window of the plurality of first windows being a portion of a speech signal over a time interval, at least some of which comprise background noise;

using a first convex optimization process over the accessed plurality of first windows to find a working solution comprising a lower dimensional representation of the plurality of first windows and an error term, the first convex optimization process being robust to the background noise in the plurality of first windows;

accessing at least one additional window;

using a second convex optimization process over only the additional at least one window to find an incremental solution comprising a lower dimensional representation of the additional at least one window and an incremental error term;

updating, by a processor, the working solution using the incremental solution;

presenting the lower-dimensional representation of the working solution to a user and receiving user input in response;

on the basis of the user input, adjusting parameters in order to control accuracy or quality, or both the accuracy and the quality, of the working solution and the speed in which the lower-dimensional representation of the working solution is calculated; and removing the background noise from the speech signal based at least in part on the working solution.

15. The method of claim 14, further comprising:

selecting between the first and second convex optimization processes on the basis of the user input.

16. A computer storage device, the computer storage device being hardware and storing computer-executable instructions which, upon execution, cause a computer to:

access, by an input, a plurality of first images at least some of which comprise distortions, each of the plurality of first images being a high-dimensional representation where each dimension represents an element of the image;

use, by a low-dimensional structure recovery system, a first convex optimization process over the accessed plurality of first images to find a working solution comprising a lower dimensional representation of the accessed plurality of first images and an error term; and where the first convex optimization process is robust to the distortions in the accessed plurality of first images and the lower dimensional representation having a lower number of dimensions that the high-dimensional representation;

access, by the input, at least one additional image;

use, by the low-dimensional structure recovery system, a second convex optimization process over only the accessed at least one additional image to find an incremental solution comprising a lower dimensional representation of the at least one additional image and an incremental error term and to update the working solution using the incremental solution; and output the updated working solution to an image sequence analysis system,
wherein the image sequence analysis system is performing at least one of foreground/background image separation of images or tracking foreground objects depicted in the images.

17. The computer storage device storing computer-executable instructions as claimed in claim 16, wherein the low-dimensional structure recovery system is at least partially implemented using hardware logic selected from any one or more of: a field-programmable gate array, a program-specific integrated circuit, a program-specific standard product, a system-on-a-chip, or a complex programmable logic device.

18. The computer storage device storing computer-executable instructions as claimed in claim 16, wherein the low-dimensional structure recovery system is arranged to use a second convex optimization process which encourages similarity between the incremental solution and the working solution.

19. The computer storage device storing computer-executable instructions as claimed in claim 16, wherein the low-dimensional structure recovery system is arranged to use a second convex optimization process which finds a minimum of a nuclear norm of a low rank matrix of the at least one additional image A' plus an L1 norm of a sparse matrix being the incremental error term, weighted by a first coefficient $\gamma_1$ and plus the square of a Frobenius norm of the difference between the low rank matrix of the at least one additional image and an average of columns of a matrix of the first images, the square of the Frobenius norm being weighted by a second coefficient $\gamma_2$.

20. The computer storage device storing computer-executable instructions as claimed in claim 16, to check accuracy of the updated working solution and select whether to continue with the second convex optimization process or the first convex optimization process according to the results of the accuracy check.

* * * * *